(12) United States Patent
Matichuk

(10) Patent No.: US 8,452,714 B2
(45) Date of Patent: May 28, 2013

(54) SYSTEM AND METHOD FOR THE AUTOMATIC CREATION OF A GRAPHICAL REPRESENTATION OF NAVIGATION PATHS GENERATED BY INTELLIGENT PLANNER

(75) Inventor: Bruce Matichuk, Alberta (CA)

(73) Assignee: Celcorp, Inc., Washington, DC (US)

( * ) Notice: Subject to any disclaimer, the term of this patent is extended or adjusted under 35 U.S.C. 154(b) by 3598 days.

(21) Appl. No.: 10/132,172

(22) Filed: Apr. 26, 2002

(65) Prior Publication Data
US 2002/0158864 A1 Oct. 31, 2002

Related U.S. Application Data

(60) Provisional application No. 60/286,378, filed on Apr. 26, 2001.

(51) Int. Cl.
*G06Q 10/00* (2012.01)

(52) U.S. Cl.
USPC .......... 705/348; 705/7.23; 705/7.25; 345/418

(58) Field of Classification Search
USPC .................. 705/348, 7.23, 7.25; 345/418
See application file for complete search history.

(56) References Cited

U.S. PATENT DOCUMENTS

| | | | |
|---|---|---|---|
| 5,321,620 A * | 6/1994 | Tanaka et al. | 700/104 |
| 5,490,097 A * | 2/1996 | Swenson et al. | 703/2 |
| 5,897,629 A * | 4/1999 | Shinagawa et al. | 706/13 |
| 5,920,314 A | 7/1999 | Maesano et al. | |
| 5,960,200 A | 9/1999 | Eager et al. | |
| 6,011,917 A * | 1/2000 | Leymann et al. | 717/104 |
| 6,023,702 A * | 2/2000 | Leisten et al. | 707/100 |
| 6,047,260 A * | 4/2000 | Levinson | 705/9 |
| 6,065,009 A | 5/2000 | Leymann et al. | |
| 6,141,665 A | 10/2000 | Hara et al. | |
| 6,289,277 B1 * | 9/2001 | Feyereisen et al. | 701/202 |
| 6,393,386 B1 * | 5/2002 | Zager et al. | 703/25 |
| 6,751,661 B1 * | 6/2004 | Geddes | 709/223 |
| 2002/0059264 A1 * | 5/2002 | Fleming et al. | 707/100 |
| 2002/0069083 A1 * | 6/2002 | Harter et al. | 705/1 |
| 2002/0169658 A1 * | 11/2002 | Adler | 705/10 |
| 2003/0167249 A1 * | 9/2003 | Park | 707/1 |

OTHER PUBLICATIONS

Google Scholar Search, Jan. 18, 2013.*
Fujiwara, R. "An Intelligent Load Flow Engine for Power System Planning", Power Systems, IEEE Transaction, vol. 1, Issue: 3, pp. 302-307, Aug. 1986.*
Sagar, M. "A Virtual Environment and Model of the Eye for Surgical Simulation", SIGGRAPH '94, Jul. 24-29.*
International Search Report, dated Dec. 10, 2002, for Application No. PCT/US02/13078.

* cited by examiner

*Primary Examiner* — Dean T Nguyen
(74) *Attorney, Agent, or Firm* — Harrington & Smith

(57) ABSTRACT

The present invention relates to a system and method for the automatic creation of a process model having a graphical representation. The system includes a planner to determine different plans for addressing a problem, and a graphics engine for displaying the process model for the different plans. Furthermore, the present invention includes a method for forming a process model having the steps of obtaining a planning data from a planning software; accessing a graphical editor; building the information needed to create a process model; and drawing a process model diagram with the graphical editor.

19 Claims, 8 Drawing Sheets

POSSIBLE GRAPHICAL REPRESENTATION

SYSTEM AND METHOD FOR THE AUTOMATIC CREATION OF A GRAPHICAL REPRESENTATION OF NAVIGATION PATHS GENERATED BY INTELLIGENT PLANNER

RELATED APPLICATIONS

The present invention claims priority from the U.S. Provisional Application No. 60/286,378, filed on Apr. 26, 2001, the disclosure of which is hereby incorporated by reference in its entirety.

FIELD OF THE INVENTION

The present invention relates to a system and method for automatically creating a process model having a graphical representation.

BACKGROUND OF THE INVENTION

Planning systems that graphically display the results of a computation are known in the prior art. For example, a planning system may display a series of tasks needed to accomplish a desired result given a set of input conditions. The planning system may even schedule the tasks in a calendar-type display as needed. For the calendar-type display case, a user typically provides to the planning system at least: a start date, an end date, and a set of goals to be accomplished between the beginning and end dates.

In general, the planning system will display a single method for accomplishing the desired goals. If the user is interested in a single result of planning computation for a set of goals, the currently known methodologies may be satisfactory. However, if the user wishes to explore the results for a number of different independent variable goals, the known methodologies are often unsatisfactory.

Another type of known software, process editors, allows users to specify and arrange a set of tasks or activities. The process editors then display the process specified by the user. The process editors may optionally check the validity and feasibility of the process specified by the user. However, the process editors do not automatically create or suggest a process for a given set of goals and tasks.

Broadly, it is an object of the present invention to provide an improved user interface for graphically displaying the results of a planning computation. This and other objects of the present invention will become apparent to those skilled in the art from the following detailed description of the invention and the accompanying drawings.

SUMMARY OF THE INVENTION

In response to deficiencies in known process and planning systems, the present invention provides for the automatic creation of a process model having a graphical representation. In particular, the present invention provides a system and method for creating the graphical representations of possible paths to achieve a desired outcome from a set of initial conditions. The system includes a planner, which preferably employs an intelligent engine to determine a plan for the different possible paths for addressing a problem, and a graphics engine for displaying the process model. Similarly, the method of the present invention includes the steps of obtaining planning data from a planning system; accessing a graphical editor; building the information needed to create a process model; and drawing the diagram of the process model with the graphical editor.

BRIEF DESCRIPTION OF THE DRAWINGS

A more complete understanding of the present invention and advantages thereof may be acquired by referring to the following detailed description taken in conjunction with the accompanying drawings, in which like reference numbers indicate like features, and wherein.

DETAILED DESCRIPTION OF THE PREFERRED EMBODIMENT

As described below, the present invention functions to correlate plan and process paradigms. Specifically, the present invention automatically creates a set of plans for using a set of inputs to achieve a set of desired goals. Subsequently, the present invention creates a process model or workflow diagram having a graphical representation.

Figure 1A:
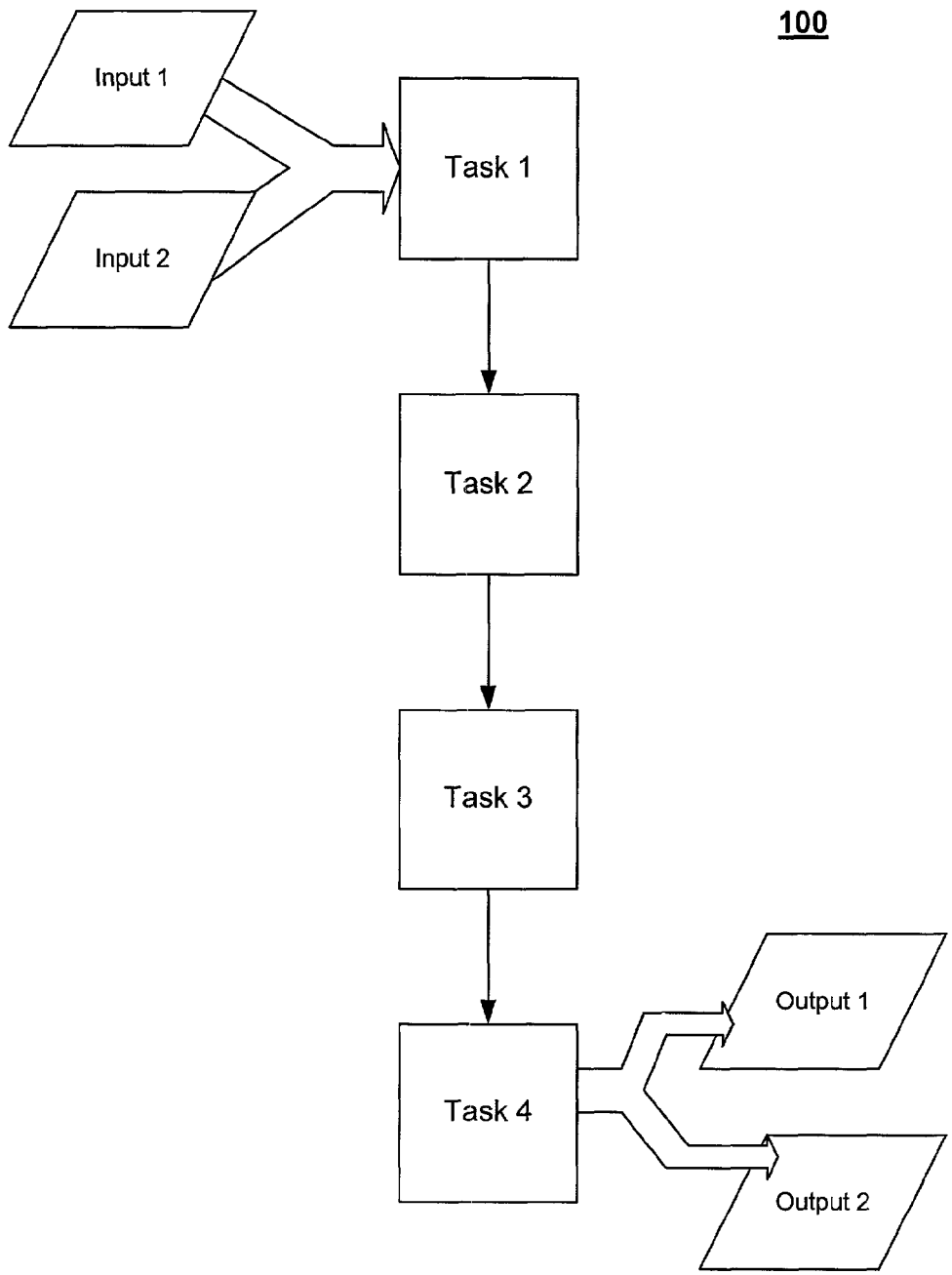
FIGS 1A-1B (PRIOR ART) illustrate block diagrams of graphical displays from known planning systems.

A graphical representation 100 provided by known planning systems is depicted in FIG. 1A. Likewise, a user may employ existing constraint-based optimization systems to form the graphical representation 100. The graphical representation 100 corresponds to a plan having a suggested series of tasks to achieve a particular set of outputs given a particular set of inputs. For instance, a user may seek to determine an optimal production schedule for a factory given a certain inventory of input materials and a certain demand for goods to be produced. Similarly, a user may use planning systems to propose a configuration for a system that integrates data between a variety of systems using a sequence of planned activity.

The graphical representation 100 in FIG. 1A generally represents a series of tasks chosen and ordered by the planning system according to various optimization criteria. For instance, the planning system may seek to minimize process costs or to minimize the time to complete the process. Alternatively, the planning system may seek to balance multiple process goals. For example, the planning system may recommend a process having relatively low process costs and a short process completion time.

Generally, a user may specify process inputs and outputs for a planning system. The user may also generally specify the particulars for the various possible tasks. Similarly, the planning model may be edited to consider various optimization goals or combinations of goals. For instance, the planning model may have various types of inputs, outputs, tasks, goals, etc. from which the user may select. Additionally, users may typically configure custom data types in a planning system.

Returning to FIG. 1A, the graphical representation 100 represents a series of tasks chosen and arranged by the planning system according to optimization criteria, as described above. Specifically, the graphical representation 100 shows a plan for converting two inputs (INPUT 1 and INPUT 2) through four tasks (TASKS 1-4) to two outputs (OUTPUTS 1 and 2).

The graphical representation 100 in FIG. 1A unfortunately does not display possible alternative plans that use the given initial inputs to achieve the desired outputs. For instance, FIG. 1B embodies an alternative graphical representation 110 displaying an alternative course of action using TASKS 1, 5, 6, and 4 to convert INPUTS 1 and 2 into OUTPUTS 1 and 2.

The user may not be aware of the alternative course of action in the second graphical representation 110 because this course of action would not be shown or suggested in the graphical display 100 produced by known planning system. Furthermore, a linear set of tasks is not particularly useful to a process engineer. The process engineer needs to evaluate the conditional events that may occur throughout the set of steps and that might take place in some environment.

Specifically, a planning system determines a preferred course of action, as embodied by the graphical representation 100 in FIG. 1A, by the state of conditions at the time of running. At a different time, the suggested course of action may no longer be optimal. For instance, suppose there is a room having two entrances, Door 1 and Door 2, where Door 1 is open only during Time Period 1 and Door 2 is open only during Time Period 2. If a user uses a planning system during Time Period 1, the known planning systems will suggest the use of Door 1 and will not indicate the possibility of using door 2. If the user attempts to enter the room during Time Period 2, the suggested plan of using Door 1 will fail, and the user may not realize the possibility of using Door 2.

Figure 3:
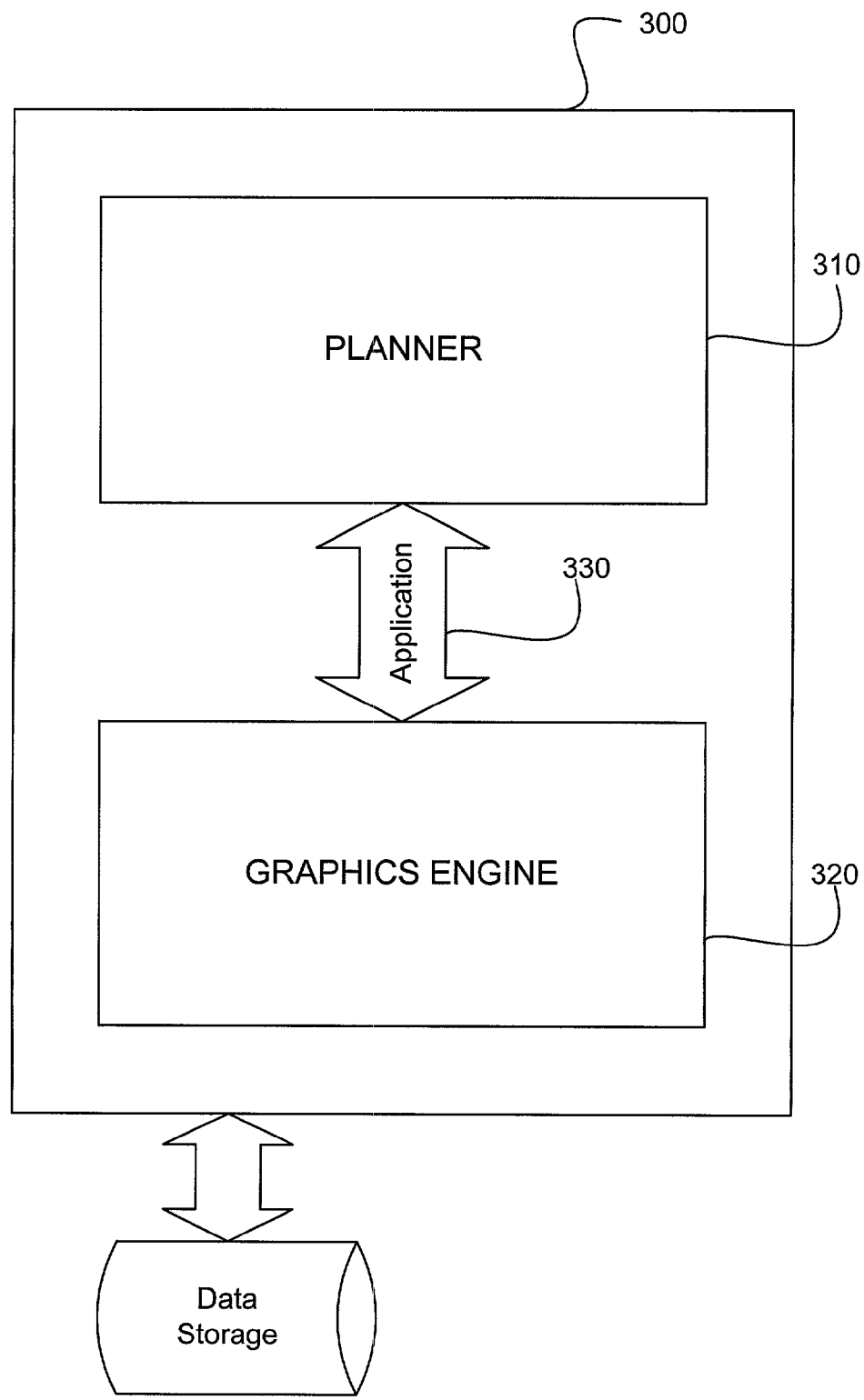
FIG. 3 illustrates a system to facilitate the automatic creation of a process model having graphical representation in accordance with embodiments of the present invention.

Accordingly, the present invention, as illustrated in FIG. 3, provides a system 300 to automatically create a process model of plans that are available for a given domain (i.e., a set of possible courses of action). The system 300 then creates a graphical representation of process model. The graphical representation formed by the system 300 illustrates the potential steps and tasks involved in navigating from a set of initial conditions to a set of end goals. Furthermore, by merging individual plans into a single process model diagram, the user may compare the different possible approaches to navigating through the domain.

The concept of a single diagram representing multiple navigation plans also allows a user to see the various decision points the user would come across while navigating a plan. In this regard, the multiple plan diagram becomes similar to a workflow diagram that allows a user to see the process flow of a domain.

Figure 2:
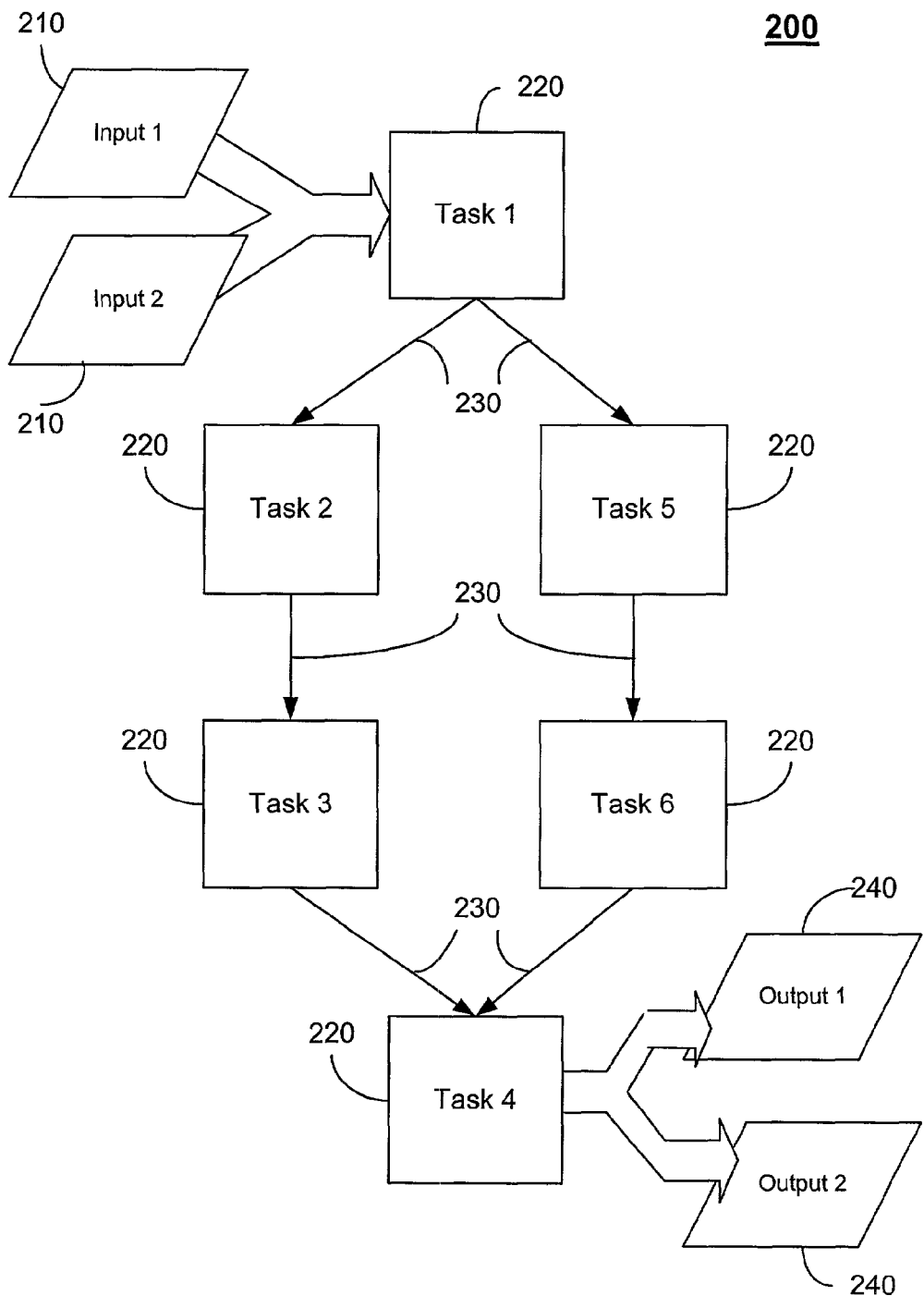
FIGS. 2 and 7 illustrate graphical representations of process models in accordance with embodiments of the present invention.

For instance, FIG. 2 represents a composite graphical display 200 illustrating the conversion of inputs 210 through a series of tasks 220. FIG. 2 also shows the relationship 230 between these tasks, as well as the desired outputs 240. Thus, the composite graphical display 200 in FIG. 2 demonstrates to the user that the inputs 210 may be converted to outputs 240 using a series of tasks 220 having alternative relationships 230. Specifically, the composite graphical display 200 displays to the user two alternatives paths for achieving the desired results (Outputs 1 and 2) given a set of initial conditions (Inputs 1 and 2). It should be appreciated that the composite graphical display 200, while shown as being comprised from rectangles, arrows, and parallelograms, may be formed using any type of graphical notation as desired by the user to provide greater clarity and understanding to a process model or workflow.

As depicted in FIG. 3, the system 300 generally includes a planner 310 and a graphics engine 320. The system 300 of the present invention generally operates by having the planner 310 create a plan having one or more methods for accomplishing a desired goal. The data from the planner 310 is then passed to the graphics engine 320 to graphically display the process model and its method(s) for accomplishing the desired goals.

The planner 310 is generally some type of known device or software application for scheduling a series of tasks to achieve a desired goal. Examples of known planning software applications include TLplan developed by Bacchus and Kabanza at the University of Toronto (see http://www.cs.toronto.edu/~fbacchus/tlplan.html), IPP developed by Koehler, Hoffmann, Brenner, and Rittinger at the University of Freiburg in Germany (see http://www.informatik.uni-freiburg.de/~koehler/ipp.html), and Blackbox developed by Selman and Huang of Cornell University and Kautz of the University of Washington (see http://www.cs.washington-.edu/homes/kautz/blackbox/). Alternatively, the planner may be a constraint-based optimization system, such as the ILOG Optimization Suite® marketed by ILOG, S.A. of Paris, France.

In one implementation of the present invention, the planner 310 is an intelligent system as embodied in Celware®, marketed by Celcorp of Edmonton, Alberta, Canada. An intelligent system is able to reason or determine the processes that have to be enabled or enacted inside an organization. The intelligent system generally consists of a reasoning engine attached to a runtime software agent. Within the intelligent system, an intelligent agent derives runtime behavior by referring to a model instead of predetermined code.

During software development, a systems analyst specifies the application requirements by building a model. At runtime, client applications can query the intelligent agent to implement business logic on demand. The intelligent agent uses the model to establish the optimal method of addressing the requirements of runtime queries. The intelligent systems approach represents the most flexible and efficient method of programming today.

Traditional integration solutions typically employ a programming method called "business rules" to specify automated responses to real-time business events. An example of a business rule is the decision(s) made when an integrated solution responds to a shipping request. A simple version of the rule might look like this: "IF the credit is approved, THEN ship order", and hence "IF credit is denied, THEN do not ship order."

When building process models with business rules, the rules are used to specify the action that will be taken in response to every possible event that can occur within a system. At runtime, a business rule processor is used to look through all the rules in the database to ensure that the appropriate tasks are being executed in response to every business event. This mechanism quickly breaks down in the face of modern system complexity, as even small systems require hundreds of rules that are unmanageable by developers. Intelligent systems avoid this problem by utilizing a reasoning engine to assist in the creation and management of tasks. The intelligent systems models employ an advanced form of business rules that is more powerful than the classical approach used by conventional process engine based systems.

The intelligent systems may further extend the integration paradigm by managing business rules in a different way. Specifically, an intelligent system may use non-linear modeling with constraints to define a business environment. For each component of a process, pre-conditions and post-conditions are defined. The intelligent system considers all of the conditions to discover the optimal plan when needed. The intelligent system takes current circumstances into account, and therefore business processes can be completely dynamic. For example, in the order fulfillment process, the pre-condition may be receiving an order, and the post-condition may be shipping the product. Furthermore, the intelligent system takes the current circumstances, like credit approval, into account when determining and navigating the optimal process path. For instance, if the intelligent system discovers that this customer is "preferred" and does not need a credit check, the system conserves resources by eliminating this part of the process at runtime.

In a preferred embodiment, the planner 310 of the present invention uses conditional planning. In conditional planning, the planner 310 takes a business problem that includes two things: a set of initial conditions and a set of goal conditions. The planner 310 takes business problems and uses an intelligence model, which evaluates sets of tasks to determine the locations for branching points where the process should be split into a series of tasks that must be accomplished. Alternatively, the process may be split into sets of tasks that are logical alternatives. The conditional-planning algorithm then determines the associated conditional plan.

Each task within a process may be given inputs in the form of business rule expression. The business rule expression may be a first-order expression, such as a Boolean logic statement where the model state variables are either true or false. The Boolean logic statement may collect or refer to a single state variable or sets of state variables. Alternatively, the business rule expression may be a simpler requirement, such as a listing of variables. Likewise, the goal or result of a task is some type of business rule expression describing required or possible results from the execution of the task.

Figure 5:
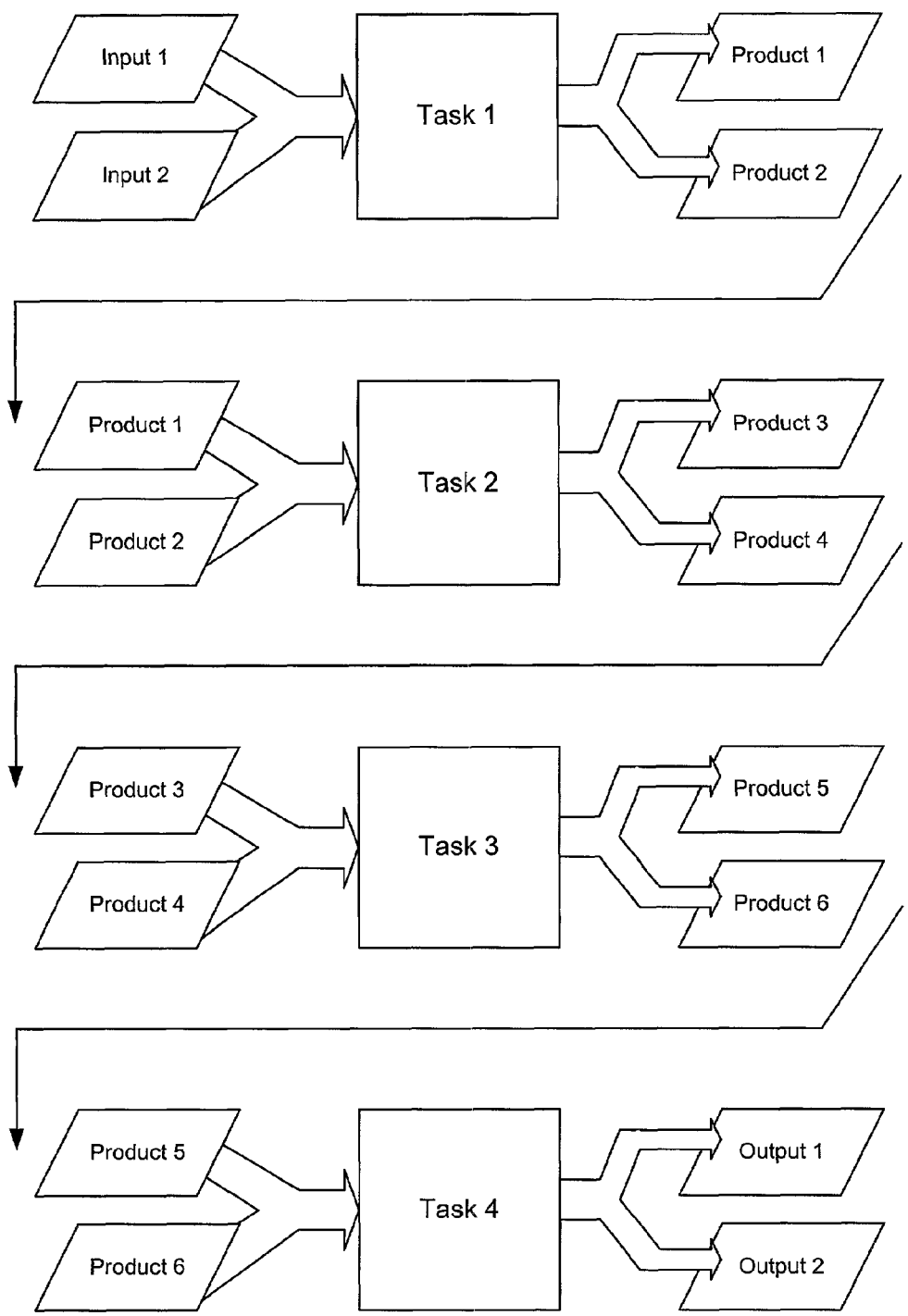
FIG. 5 is a schematic diagram illustrating the creation of a plan to use certain inputs to achieve certain desired outputs by an intelligent planner in accordance with embodiments of the present invention.

The operation of an intelligent planner is depicted in FIG. 5, which illustrates a process 500 in which every task has a required set of input(s) and output(s). The planner using an intelligent agent creates a plan by associating the outputs of a first task with the inputs of a subsequent task. Obviously, while every task is displayed with two inputs and two outputs, a task may have any number of inputs and outputs. Furthermore, while process 500 shows every task receiving inputs produced as outputs from a previous task, an input may exist within a system that is independent from any preceding task. For instance, an input may be indefinitely stored in inventory or may be commercially obtained when needed to initiate a task.

It should also appreciated that any single task may represent an abstract complex combination of subtasks. For instance, the task of acquiring an item may require a business to 1) research suppliers; 2) contact suppliers; 3) solicit bids; 4) evaluate the bids; 5) negotiate conditions for a purchase; 6) arrange payment; and 7) arrange delivery.

Continuing with FIG. 3, the system 300 further includes the graphics engine 320. The graphics engine 320 is a known technology that allows devices and software to convert stored data into an alternative format that may be graphically displayed. For instance, the graphics engine 320 may be Microsoft Visio®.

Alternatively, the graphics engine 320 may be process modeling systems that create process models having graphically displays. Known process modeling systems include Vitria Collaborative Applications® marketed by Vitria of Sunnyvale, Calif. and Gemini Series® marketed by ClearOrbit of Austin, Tex. Similarly, the graphical engine 320 may be workflow editing software such as WebSphere® marketed by IBM, Corp. of Armonk, N.Y., Returning to FIG. 3, the system 300 may further include an application 330 that accesses and exchanges information from the planner 310 and graphics engine 320. The application 330 is a generally a runtime software agent to coordinate the operation of elements 310 and 320. The application 330 may contain the code to create the process model diagram and may be composed using any type of computer programming language such as Java, C, C++®, C#®, VisualBasic®, etc. or other equivalent methods for initiating necessary operations on computing devices and comparable machines.

Continuing with FIG. 3, the system 300 may further contain some type of data storage device that allows the application 330 to access, store, and transfer information to/from the planner 310 and the graphics engine 320. The storage device may also store the graphical display of the plan as needed for future display or for transfer to other users.

Figure 4:
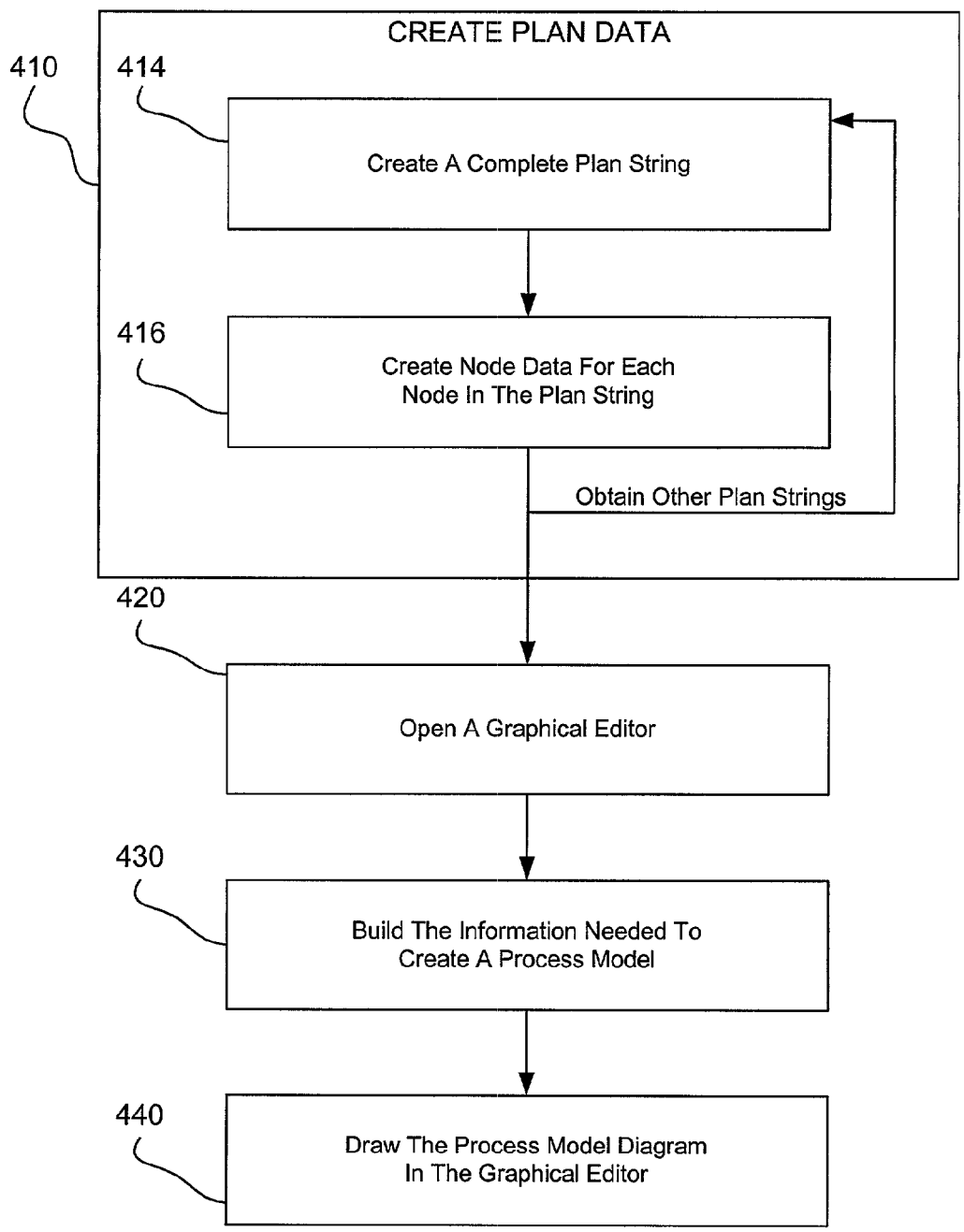
FIG. 4 illustrates a flow chart depicting steps in a related method to facilitate the automatic creation of a process model having graphical representation in accordance with embodiments of the present invention.

Turning now to FIG. 4, another embodiment of the present invention provides a related method 400 to automatically create graphical representations of navigation paths generated by an intelligent planner. The method 400 includes the steps of obtaining a planning data from a planning system, step 410; accessing a graphical editor, step 420; building the information needed to create a process model; and drawing the process model diagram in the graphical editor, step 440. Each of these steps is described in greater detail below.

Figure 1B:
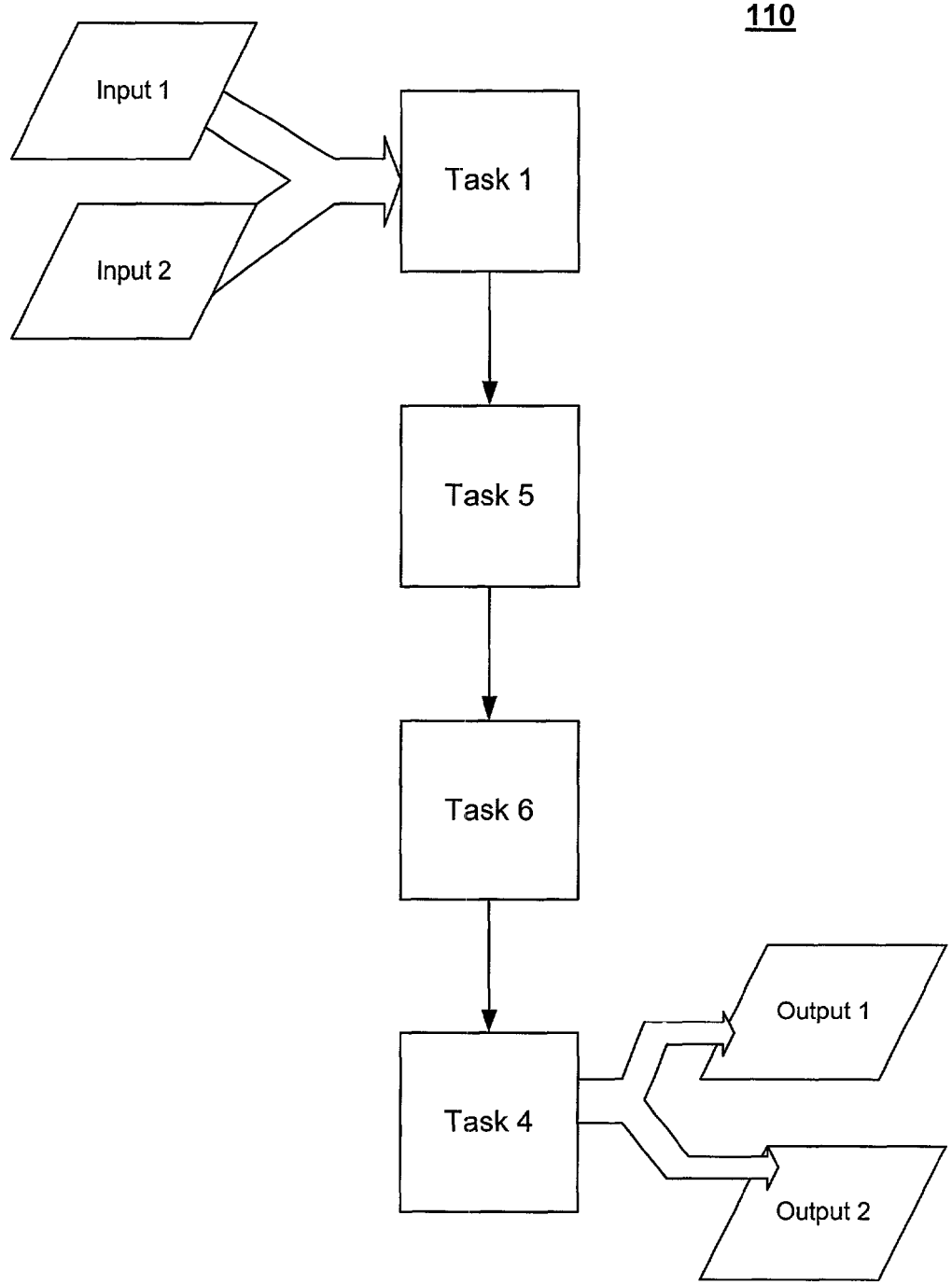

In step 410, a planning data is obtained from the planning system. The operation of the planning system is known and described in detail above. For instance, the graphical representation 100 and the alternative graphical representations 110 illustrated, respectively, in FIGS. 1A-1B represent two possible plans having various tasks for achieving Outputs 1 and 2 given Inputs 1 and 2.

In one embodiment, the planning system specifies planning data by forming one or more planning strings, step 414. The planning string is an ordered list of the tasks for achieving a desired output from a given input. As generally known in the fields of planning systems and process modeling systems, each of the tasks and decisions points may be defined as a node. Therefore, the individual planning strings formed in step 414 may be subdivided into nodes. Accordingly, the next step 416 is to define node data for each node in a plan string. The node data may include a name for the node, the position of the node in the plan string, the name for the particular plan string, inputs and outputs of the node, etc. Subsequently, steps 414 and 416 may be repeated for other plan strings.

The next step, step 420, is to access and initiate a graphical editor. As described above, the graphical editor may be known, commercially available software. The graphical editor may be integrated with the planning software or may operate independently.

After the graphical editor is initiated in step 420, the next step is to build the information needed to create a process model, step 430. Step 430 generally involves the creation of a process model that is a composite of the plan data created in step 410. The process model contains series of process data representing nodes in the plans. The process model is organized such that nodes that are performed alternatively or concurrently are grouped together at a particular level. Thus, the process model includes various branches and options for implementing the plans. In one implementation, node data may also contain a list of predecessor nodes, thus ordering the process model.

Subsequently, the graphical editor draws a diagram of the process model, step 440. Specifically, the graphical editor uses the process model data from step 430 to create a graphical representation.

Figure 6:
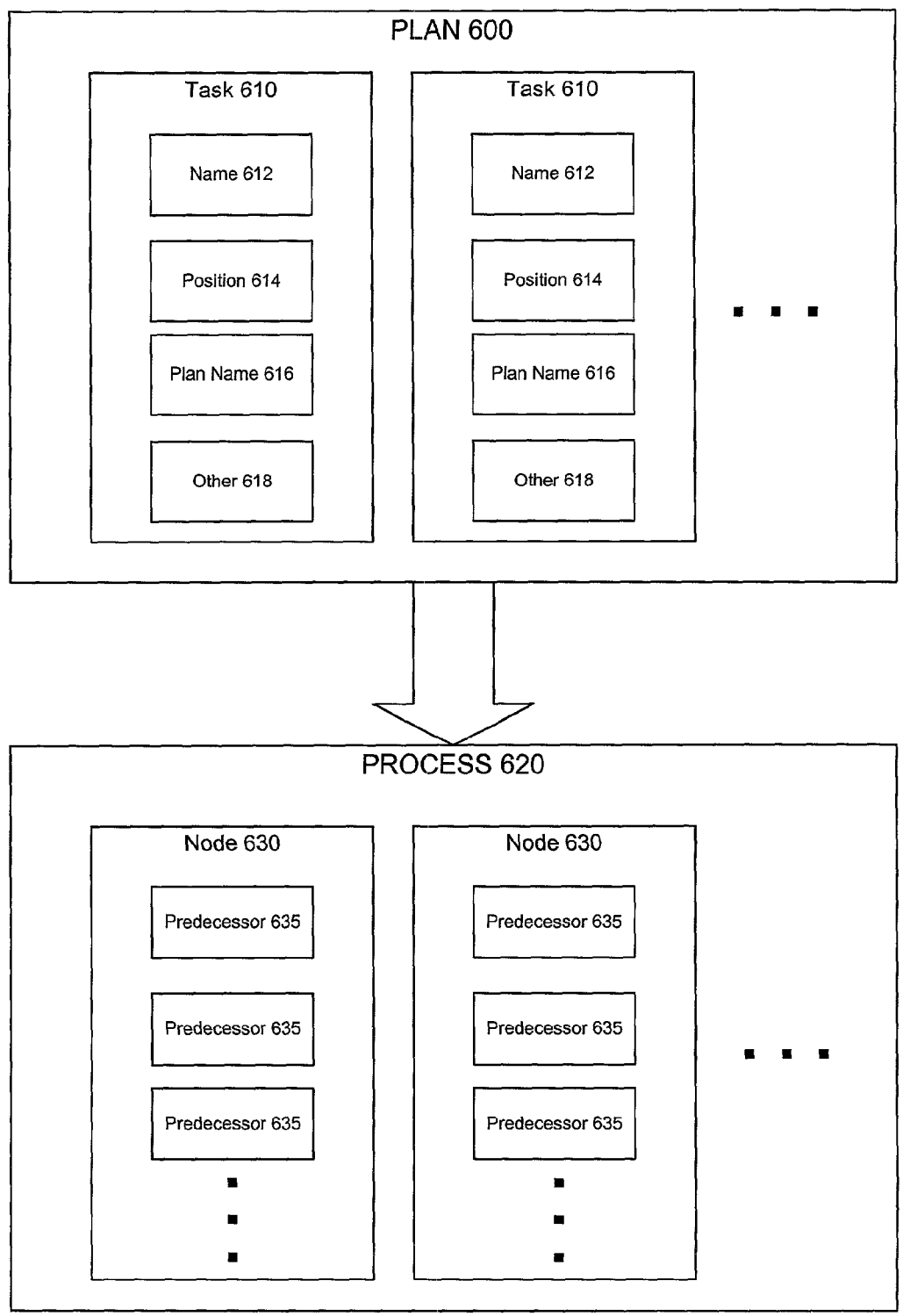
FIG. 6 is a schematic diagram illustrating the conversion of plan data to process data in accordance with embodiments of the present invention.

Thus, as seen in FIG. 6, the method 400 works to map plans 600 to a process model 620, where the plan comprises one or more tasks 610, and the process model comprises one or more nodes 630. The tasks 610 are generally created by the planning software, and each of the tasks 610 may include identifying information such as an node name 612, a node location 614, a plan identifier 616, and other relevant information 618. It should be appreciated that any other information by be used to identify and describe the tasks 610 in a plan.

Similarly, each of nodes 630 may include identifying information. For instance, FIG. 6 illustrates nodes 630 having data 635 identifying predecessor nodes. Again, it should be appreciated that the item objects 630 may contain various other information useful in identifying, positioning or otherwise graphically representing the navigation paths generated by the planner.

Figure 7:
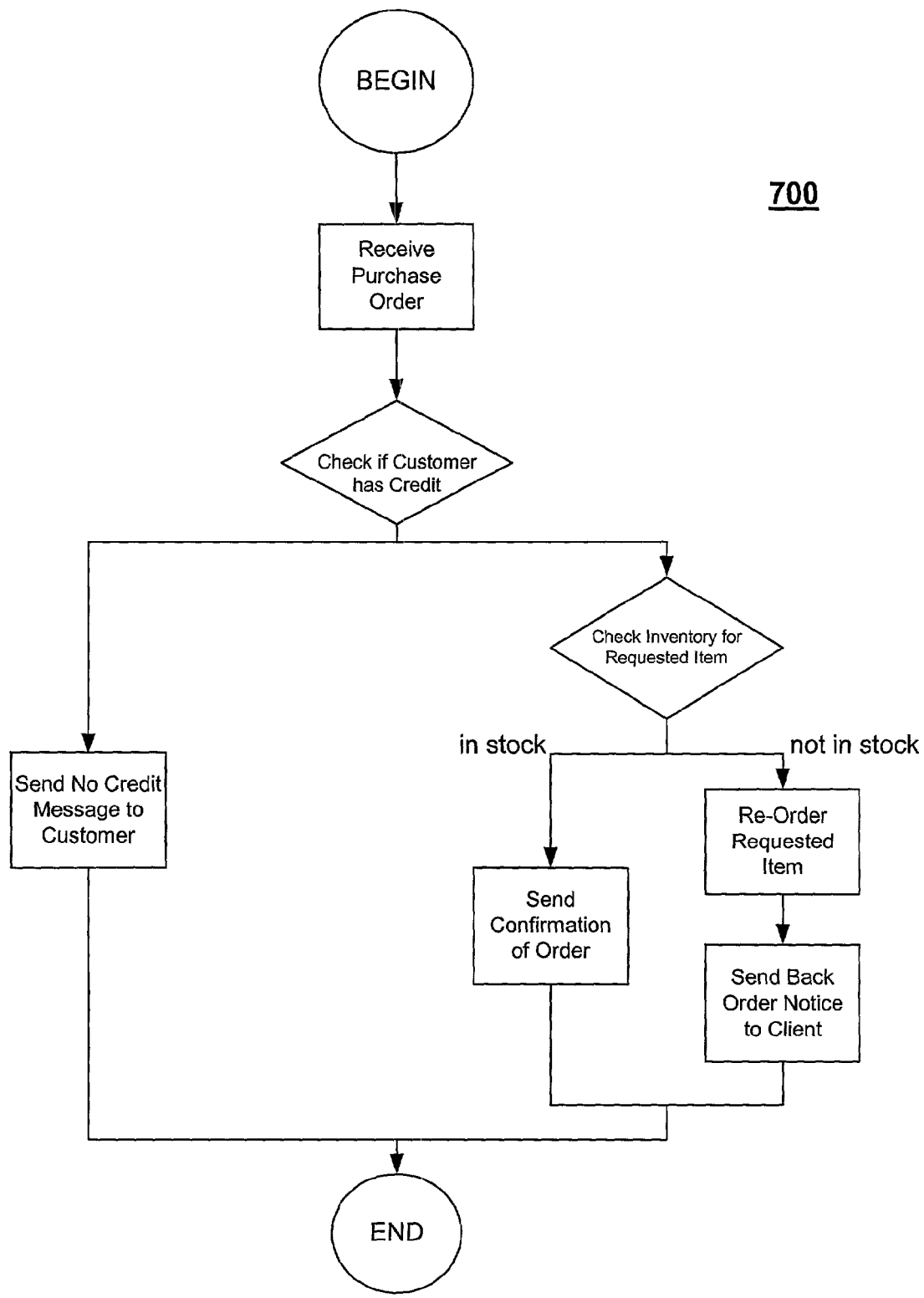

An exemplary process model 700 is depicted in FIG. 7. Specifically, the illustrated process model represents the potential tasks to be implemented following the receipt of a customer order. The first task is the access the customer's credit. If the customer does not have credit, the business notifies the customer that the order will not be fulfilled. Alternatively, if the customer has credit, the business will attempt to fulfill the order. The business checks its inventory to determines whether the desired item is in stock. If the item is in stock, the business sends an order confirmation to the customer. Otherwise, the business orders the desired item and notifies the customer that the item is on backorder.

The foregoing description of the preferred embodiments of the invention has been presented for the purposes of illustration and description. It is not intended to be exhaustive or to limit the invention to the precise form disclosed. Many modifications and variations are possible in light of the above teaching. For instance, the method of the present invention may be modified as needed for use with other types of planners or graphic engines as they are developed. It is not intended that the scope of the invention be limited by this detailed description. The above specification, examples, and data provide a description of the manufacture and use of the composition of the invention. Since many embodiments of the invention can be made without departing from the spirit and scope of the invention, the invention resides in the claims hereinafter appended.

What is claimed:

1. A method comprising:
obtaining planning data using a computer system, wherein the planning data comprises a plurality of plans concerning first initial condition and a first goal, each of the plans describing at least one alternate path indicating how to achieve the first goal when starting from the first initial condition, wherein the first initial condition or the first goal comprises a first business rule;
using the planning data by the computer system for creating a process model;
generating a graphical representation of the process model using the computer system.

2. The method of claim 1 further comprising:
depicting the graphical representation of the process model on a display.

3. A system comprising;
a planner configured to generate a plurality of plans concerning a first initial condition and a first goal, wherein each of the plans describe a first path indicating how to achieve the first goal when starting from the first initial condition, wherein each of the plans describe an alternate path indicating how to achieve the first goal when starting from the first initial condition, and wherein the first initial condition or the first goal comprises a first business rule;
a graphics engine configured to receive the plans from the planner; to convert the plans into a process model; and to generate a graphical representation of the process model; and
a data storage device configured to store data generated by at least one of the planner and graphics engine.

4. A method comprising:
obtaining planning data using a computer system, wherein the planning data further comprises a plurality of plans, each of the plans comprising at least one initial condition and at least one goal, wherein at least one of the initial conditions comprises a business rule expression, each of the plans further comprising at least one path describing how to achieve the at least one goal when starting from the at least one initial condition, wherein a first one of the plans comprises a first one of the initial conditions, a first one of the goals and a first one of the paths, and wherein a second one of the plans comprises the first initial condition, the first goal and a second one of the paths which is at least partially different from the first path;
using the planning data by the computer system for creating a graphical representation of a process model; and
drawing the graphical representation of the process model on a display using the computer system.

5. A system comprising:
a planning data producing means for producing planning data, wherein the planning data comprises a plurality of plans, each of the plans comprising at least one initial condition and at least one goal, wherein at least on of the initial conditions and at least one of the goals comprises a respective business rule expression, each of the plans further comprising at least one path describing how to achieve the at least one goal when starting from the at least one initial condition, wherein a first one of the plans comprises a first one of the initial conditions, a first one of the goals and a first one of the paths, and wherein a second of the plans comprises the first initial condition, the first goal and a second one of the paths which is at least partially different from the first path;
a graphics means for receiving the planning data; for converting the planning data into a process model and for generating a graphical representation of the process model; and
a data storage means for storing data generated by at least one of the data producing means and the graphics means.

6. A computer program product comprising a non-transitory memory storing a computer readable program executable by processing apparatus, the computer program for automatically creating a graphical display of a process model, the computer readable program comprising:
computer readable program code configured to create planning data, wherein the planning data further comprises a plurality of plans, each of the plans comprising at least one initial condition and at least one goal, wherein the at least one initial condition comprises a business rule expression, each of the plans further comprising at least one path describing how to achieve the at least one goal when starting from the at least one initial condition, wherein a first one of the plans comprises a first one of the initial conditions, a first one of the goals and a first one of the paths, and wherein a second one of the plans comprises the first initial condition, the first goal and a second one of the paths which is at least partially different from the first path;

computer readable program code configured to use the planning data to create the process model; and computer readable program code configured to create the graphical display of the process model.

7. A method comprising:

obtaining planning data from a planning system, wherein the planning data comprises a plurality of plans, each of the plans comprising at least one initial condition and at least one goal, wherein at least one of the goals comprises a business rule expression, each ,of the plans further comprising at least one path describing how to achieve the at least one goal when starting from the at least one initial condition, wherein a first one of the plans comprises a first one of the initial conditions, a first one of the goals and a first one of the paths, and wherein a second one of the plans comprises the first initial condition, the first goal and a second different one of the paths;

accessing a graphical editor on a computer system;

using the planning data by the computer system to create a graphical representation of a process model; and drawing the graphical representation of the process model with the graphical editor using the computer system.

8. A system comprising:

a planning data producing means for producing planning data, wherein the planning data comprises a plurality of plans, each of the plans comprising at least one initial condition and at least one goal, wherein at least one of the initial conditions and at least one of the goals comprises a respective business rule expression, each of the plans further comprising at least one path describing how to achieve the at least one goal when starting from the at least one initial condition, wherein a first one of the plans comprises a first one of the initial conditions, a first one of the goals and a first one of the paths, and wherein a second one of the plans comprises the first initial condition, the first goal and a second one of the paths which is at least partially different from the first path;

a graphics means for receiving the planning data; for converting the planning data into a process model and for generating a graphical representation of the process model; and a data storage means for storing data generated by at least one of the data producing means and the graphics means.

9. The method of claim 8, wherein each of the at least one initial conditions includes a business rule expression.

10. The method of claim 8, wherein each of the nodes has one or more initial conditions and one or more node effects, wherein each of the node initial conditions and the node effects includes a business rule expression.

11. The method of claim 7, wherein the planning data includes information identifying a node in a plan.

12. The method of claim 7, wherein the process model includes data identifying a node in the process model.

13. The method of claim 12, wherein the identifying data identifies predecessor nodes.

14. A system comprising:

a planner configured to generate automatically a plurality of plans, each of the plans comprising at least one initial condition and at least one goal, each of the plans further comprising at least one path describing how to achieve the at least one goal when starting from the at least one initial condition, wherein each of the at least one initial conditions and each of the at least one goals includes a business rule expression, wherein a first one of the plans comprises a first one of the initial conditions, wherein a second one of the plans comprises the first initial condition, wherein the first plan comprises a first one of the goals, wherein the second plan comprises the first goal, wherein the first plan between the first initial condition and the first goal comprises a first one of the paths, and wherein the second plan comprises a second different one of the paths between the first initial condition and the first goal;

a graphics engine configured to receive the plans from the planner; to convert the plans into a process model; and to generate a graphical representation of the process model; and a data storage device configured to store data generated by at least one of the planner and the graphics engine.

15. The system of claim 14, wherein the business rule expression is a quantifiable first-order logic expression.

16. The system of claim 15, wherein the quantifiable first-order logic expression is a Boolean expression.

17. The system of claim 14, wherein said planner uses an intelligent agent.

18. The system of claim 17, wherein each of the plans includes one or more tasks, wherein each of the tasks has one or more inputs and one or more outputs, and wherein each of the task's inputs and outputs includes a business rule expression.

19. The system of claim 14 further comprising an application that transfers data between the planner and the graphics engine.

* * * * *

UNITED STATES PATENT AND TRADEMARK OFFICE
CERTIFICATE OF CORRECTION

PATENT NO. : 8,452,714 B2
APPLICATION NO. : 10/132172
DATED : May 28, 2013
INVENTOR(S) : Bruce Matichuk Page 1 of 1

It is certified that error appears in the above-identified patent and that said Letters Patent is hereby corrected as shown below:

In the Claims:

In Claim 5:
Column 8, line 32, "wherein at least on of" should be deleted and -- wherein at least one of -- should be inserted.

Column 8, line 40, "second of" should be deleted and -- second one of -- should be inserted.

In Claim 7:
Column 9, line 10, ",of" should be deleted and -- of -- should be inserted.

In Claim 8:
Column 9, lines 23-43, "A system comprising: a planning data producing means for producing planning data, wherein the planning data comprises a plurality of plans, each of the plans comprising at least one initial condition and at least one goal, wherein at least one of the initial conditions and at least one of the goals comprises a respective business rule expression, each of the plans further comprising at least one path describing how to achieve the at least one goal when starting from the at least one initial condition, wherein a first one of the plans comprises a first one of the initial conditions, a first one of the goals and a first one of the paths, and wherein a second one of the plans comprises the first initial condition, the first goal and a second one of the paths which is at least partially different from the first path; a graphics means for receiving the planning data; for converting the planning data into a process model and for generating a graphical representation of the process model; and a data storage means for storing data generated by at least one of the data producing means and the graphics means." should be deleted and -- The method of claim 7, wherein obtaining planning data from a planning system further comprises: forming one or more plan strings, wherein each of the plan strings has one or more nodes; and creating node data for each of the nodes. -- should be inserted.

Signed and Sealed this
Seventeenth Day of September, 2013

Teresa Stanek Rea
*Deputy Director of the United States Patent and Trademark Office*